(12) United States Patent
Labovich et al.

(10) Patent No.: US 11,995,099 B2
(45) Date of Patent: *May 28, 2024

(54) SYSTEM AND METHOD FOR SWITCHING FROM CONSISTENT DATABASE TO AN EVENTUAL CONSISTENT DATABASE REPLICA IN REAL TIME WHILE PREVENTING READS OF PAST VERSIONS OF THE DATA

(71) Applicant: Google LLC, Mountain View, CA (US)

(72) Inventors: Pavel Labovich, Bothell, WA (US); Denis Seniuc, Kenmore, WA (US); Vikas Yadav, Kirkland, WA (US); Yuly Suvorov, Kirkland, WA (US); Eleanor Wong, Seattle, WA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/699,853

(22) Filed: Mar. 21, 2022

(65) Prior Publication Data
US 2022/0318265 A1 Oct. 6, 2022

Related U.S. Application Data

(63) Continuation of application No. 16/682,513, filed on Nov. 13, 2019, now Pat. No. 11,288,285.

(51) Int. Cl.
G06F 16/20 (2019.01)
G06F 16/23 (2019.01)
G06F 16/27 (2019.01)

(52) U.S. Cl.
CPC .......... *G06F 16/27* (2019.01); *G06F 16/2379* (2019.01); *G06F 16/273* (2019.01)

(58) Field of Classification Search
None
See application file for complete search history.

(56) References Cited

U.S. PATENT DOCUMENTS

| | | | |
|---|---|---|---|
| 11,314,717 B1 * | 4/2022 | Certain | G06F 16/2308 |
| 2013/0054536 A1 * | 2/2013 | Sengupta | G06F 16/21 707/654 |
| 2016/0246687 A1 * | 8/2016 | Stark | G06F 16/11 |
| 2016/0294975 A1 | 10/2016 | Kemmler et al. | |
| 2017/0091228 A1 * | 3/2017 | Middlekauff | G06F 16/273 |

(Continued)

FOREIGN PATENT DOCUMENTS

| | | |
|---|---|---|
| JP | 2016051256 A | 4/2016 |
| JP | 2016103115 A | 6/2016 |

OTHER PUBLICATIONS

International Search Report and Written Opinion for International Application No. PCT/US2020/060357 dated Feb. 5, 2021. 14 pages.

(Continued)

*Primary Examiner* — Jau Shya Meng
(74) *Attorney, Agent, or Firm* — Lerner David LLP

(57) ABSTRACT

The present disclosure provides for consistent reads in a global database that is replicated to one or more global clones. A state machine is implemented, and executed independently, for each project in each region. Based on the state of a project when a read request is received, the read request will be served by the global database, served by the global clone, or ignored as an invalid request.

20 Claims, 8 Drawing Sheets

(56) References Cited

U.S. PATENT DOCUMENTS

| | | |
|---|---|---|
| 2019/0149399 A1 | 5/2019 | Reed et al. |
| 2019/0155937 A1 | 5/2019 | Barve et al. |
| 2019/0197173 A1 | 6/2019 | Tahara et al. |
| 2020/0145480 A1* | 5/2020 | Sohail .................. G06F 16/951 |

OTHER PUBLICATIONS

First Examination Report for Indian Patent Application No. 202247020935 dated Aug. 8, 2022. 6 pages.
International Preliminary Report on Patentability for International Application No. PCT/US2020/060357 dated May 27, 2022. 9 pages.
Office Action for Japanese Patent Application No. 2022-521504 dated Aug. 1, 2023. 4 pages.

\* cited by examiner

SYSTEM AND METHOD FOR SWITCHING FROM CONSISTENT DATABASE TO AN EVENTUAL CONSISTENT DATABASE REPLICA IN REAL TIME WHILE PREVENTING READS OF PAST VERSIONS OF THE DATA

CROSS-REFERENCE TO RELATED APPLICATIONS

The present application is a continuation of U.S. patent application Ser. No. 16/682,513, filed Nov. 13, 2019, the disclosure of which is incorporated herein by reference.

BACKGROUND

Infrastructure-as-a-Service is supported by a global network of computing devices that serve as the control and data plane. A data store provides the data for such large control plane services. Within the global network there are multiple distinct regions. While some of the computing resources are isolated within the regions, some resources are global. However, the control planes typically do not communicate directly with the global database. A global stack is maintained for global resources. The stack may be, for example, a set of computing resources with business logic. When a customer wants to create a virtual machine, for example, a request is sent to a regional stack, and business logic implemented in the regional stack will reach out to the global database to obtain the requested information.

One problem with the above setup is that all regions are interconnected by network links, and the links can experience outages. Accordingly, the global database is replicated in a global clone database. However, because the global database and the global clone are asynchronously updated, there is typically a delay between updating the global database and replicating such updates in the global clone database. For example, the delay can be anywhere from tens of milliseconds to tens of seconds. Accordingly reading from the global database and the global clone database at a given time may produce inconsistent reads. This may trigger multiple issues and side effects in the business logic. As one example, if the control plane store reads data at a first timestamp and then at a second consecutive timestamp, the data from the first timestamp will always be older, or perhaps the same, as the second timestamp. This invariant ensures integrity. For example, a virtual machine resource that has been "deleted" cannot "undelete". However, reading from the global database and then consecutively from a global clone does not conventionally provide for the same invariant. Rather, it would allow a read of a "deleted" virtual machine from the global database, and then at slightly later time read a clone and find it still "active".

BRIEF SUMMARY

The present disclosure provides for consistent reads in a global database that is replicated to one or more global clones. A state machine is implemented, and executed independently, for each project in each region. A project may be, for example, a grouping of resources that belong to the same customer. Based on the state of a project when a read request is received, the read request will be served by the global database, served by the global clone, or ignored as an invalid request.

One aspect of the disclosure provides a method, including enabling a global clone in a first region for a project, wherein enabling the global clone comprising receiving data for the project from a global database at the global clone for replication. The method further includes setting, by one or more processors in the first region, a state for the project to a pending state, recording, by the one or more processors in the first region, a timestamp corresponding to a time the state was set to the pending state, receiving, by the one or more processors in the first region, a request to read data for the project, and when the state for the project is in the pending state, redirecting the request to the global database at a time corresponding to the timestamp. According to some examples, the method may further include determining, by the one or more processors in the first region, whether the global clone has been updated with the same data as in the global database as of the time of the timestamp, and if the global clone has been updated with the same data, changing the state for the project to a ready state.

It may further include receiving, by the one or more processors in the first region, a second request to read data from the project, and when the project is in the ready state, fulfilling the request using data from the global clone. In other examples, it may further include changing the state for the project from the ready state back to the pending state, and recording a second timestamp for the time of the change from the ready state to the pending state.

Another aspect of the disclosure provides a system, including a global clone in a first region, the global clone configured to replicate data from a global database for a project, and one or more computing devices. The one or more computing devices are configured to receive data for the project from the global database at the global clone for replication, set a state for the project to a pending state, record a timestamp corresponding to a time the state was set to the pending state, receive a request to read data for the project, and when the state for the project is in the pending state, redirect the request to the global database at a time corresponding to the timestamp.

According to some examples, the one or more computing devices may be further configured to determine whether the global clone has been updated with the same data as in the global database as of the time of the timestamp, and if the global clone has been updated with the same data, change the state for the project to a ready state.

Yet another aspect of the disclosure provides a non-transitory computer-readable medium storing instructions executable by one or more processors for performing a method of serving read requests to a global clone. The method includes receiving data for a project from a global database at the global clone for replication, setting a state for the project to a pending state, recording a timestamp corresponding to a time the state was set to the pending state, receiving a request to read data for the project, and when the state for the project is in the pending state, redirecting the request to the global database at a time corresponding to the timestamp. According to some examples, execution of the instructions may further provide for determining whether the global clone has been updated with the same data as in the global database as of the time of the timestamp, and if the global clone has been updated with the same data, changing a state for the project to a ready state. Execution of the instructions may further provide for receiving a second request to read data from the project, and when the project is in the ready state, fulfilling the request using data from the global clone.

DETAILED DESCRIPTION

Figure 1:
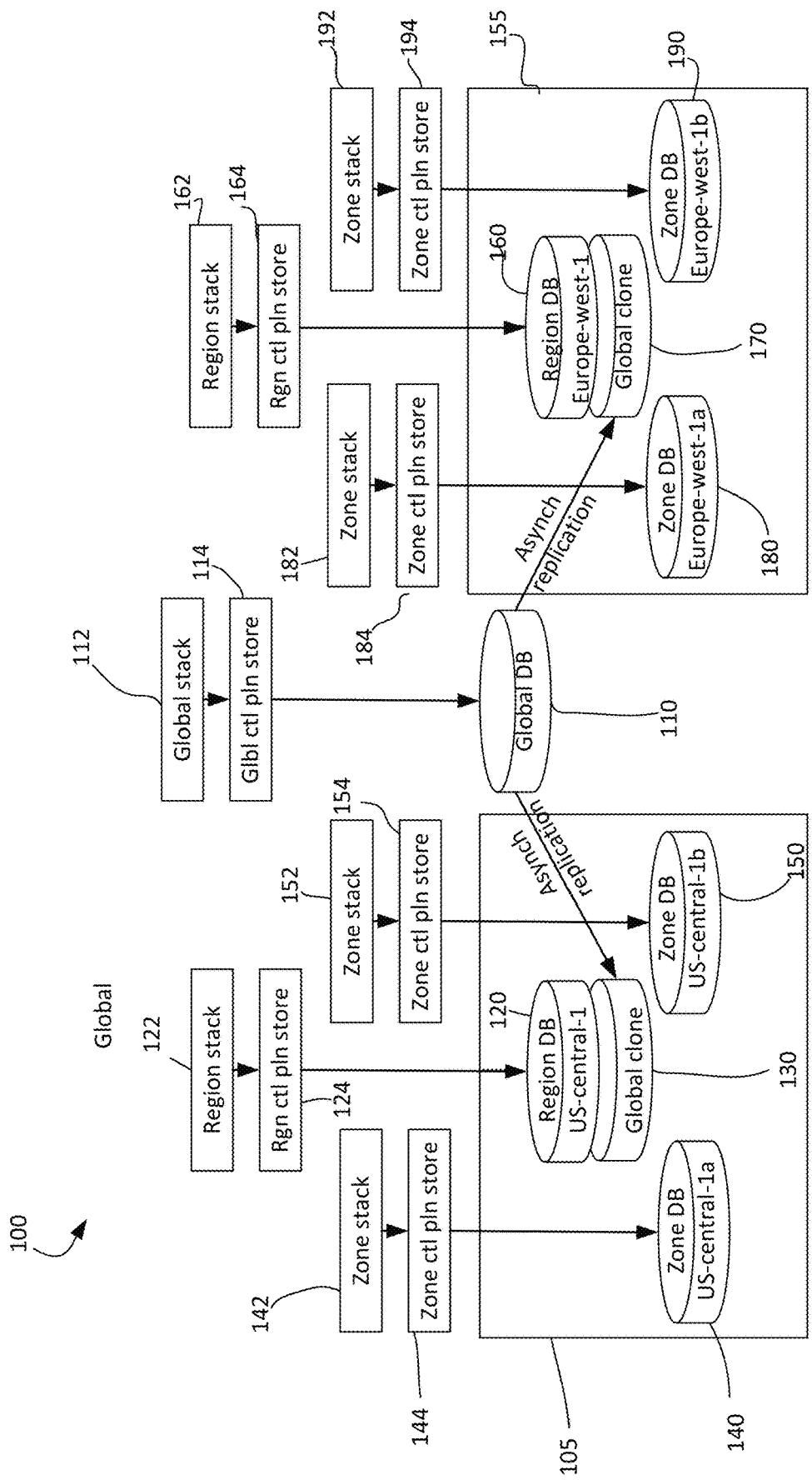
FIG. 1 illustrates an example system according to aspects of the disclosure.

FIG. 1 illustrates an example system 100 including a global database 110 and a plurality of regional databases 120, 160. Within each region 105, 155 are zone databases 140, 150, 180, 190. For example, the zones in which zone databases 140, 150 reside may be sub-areas of the region served by region database 120. Similarly, the zones in which zone databases 180, 190 reside may be sub-areas of the region served by region database 160. The zones may have high-bandwidth, low-latency network connections to other zones in the same region. While only a few regions 105, 155 are shown, it should be understood that a global system may include any number of regions, with any number of zones in each region.

Each region 105, 155 also includes a global clone database 130, 170. The global database 110 is asynchronously replicated to the global clone databases 130, 170. In some examples, all data from the global database 110 may be replicated to both clones 130, 170. According to other examples, some data from the global database 110 is replicated to a first clone 130, while other data from the global database 110 is replicated to the second clone 170. For example, particular projects may be replicated to the clone in a particular region.

Each database is controlled by a stack. For example, global stack 112 serves as the control plane for the global database 101. Region stacks 122, 162 serve as the control planes for region databases 120,170, respectively. Within a first region 105, zone stacks 142, 152 serve as the control planes for the zone database 140, 150, respectively. Within a second region 155, zone stacks 182, 192 serve as control planes for the zone databases 180, 190 respectively.

Control plane stores provide a data layer for the control plane services. Each database and stack may have a dedicated control plane store. For example, as shown in FIG. 1, global control plane store 114 provides the data layer for the global stack 112. Region control plane stores 124, 164 provide data layers for the region stacks 122, 162, respectively. Zone control plane stores 144, 154, 184, 194 provide data layers for the zone stacks 142, 152, 182, 192, respectively.

The global database 110 is capable of reading past versions of data. For example, when updates are made to the database 110, rather than immediately erasing the previous information, the previous information may be retained for a period of time. The period of time may be minutes, hours, days, etc. Accordingly, the global database 110 allows a control plane store 114 service to read data at an arbitrary timestamp in the past, such as a "current" timestamp, −30 minutes, −4 hrs, etc.

Figure 2:
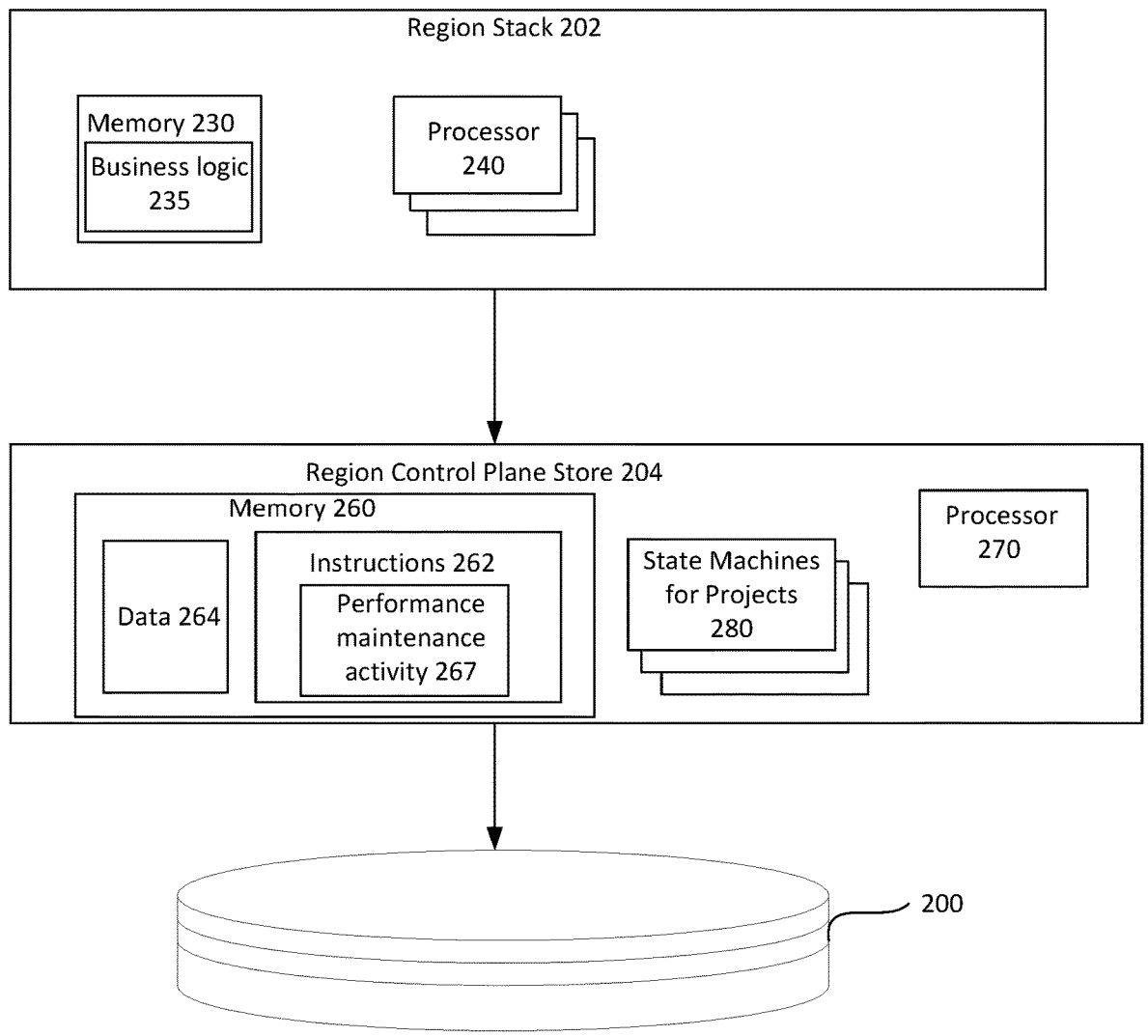
FIG. 2 is a block diagram illustrating example details of components of the system of FIG. 1.

FIG. 2 provides further details regarding the stacks and control plane stores. Region stack 202 includes a set of computing resources. For example, the stack 202 includes one or more processors 240. The processors 240 are configured to execute data and instructions in memory 230. For example, the processors 240 may execute business logic 235 to control virtual infrastructure (IaaS) of a project.

The processors 240 can be any conventional processors, such as commercially available CPUs. Alternatively, the processors can be dedicated components such as an application specific integrated circuit ("ASIC") or other hardware-based processor. Although not necessary, the stack 202 may include specialized hardware components to perform specific computing processes.

The stack 202 may use the database 200 to persist the state of resources processed by the processor 240. The database 200 memory 230 may be a type of non-transitory computer readable medium capable of storing information accessible by the processor 240, such as a hard-drive, solid state drive, tape drive, optical storage, memory card, ROM, RAM, DVD, CD-ROM, write-capable, and read-only memories.

The memory 230 can store information accessible by the processor 240, including instructions that can be executed by the processor 240 and that can be retrieved, manipulated or stored by the processor 240.

The instructions can be a set of instructions executed directly, such as machine code, or indirectly, such as scripts, by the processor 240. In this regard, the terms "instructions," "steps" and "programs" can be used interchangeably herein. The instructions can be stored in object code format for direct processing by the processor 240, or other types of computer language including scripts or collections of independent source code modules that are interpreted on demand or compiled in advance. Functions, methods, and routines of the instructions are explained in more detail in the foregoing examples and the example methods below.

The data can be retrieved, stored or modified by the processor 240 in accordance with the instructions. The data can also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data.

The memory 230 includes business logic 235 for controlling data in the database 200. For example, the business logic 235 may determine how transactions with the database 200 are handled. Depending on a state of the global clone for a project, the business logic 235 will serve the read requests differently. For example, and as described further herein, if the global clone for a project is pending, the business logic 235 will read data from the global database at a time corresponding to a timestamp when the clone entered the pending state. If the global clone for the project is ready, the business logic 235 will serve the request by reading data from the global clone.

Although FIG. 2 functionally illustrates the processor, memory, and other elements of computing device 200 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 200. Accordingly, references to a processor, computer, computing device, or memory will be understood to include references to a collection of processors, computers, computing devices, or memories that may or may not operate in parallel. For example, the computing devices 200 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The region control plane store 204 may contain one or more processors 270, memory 260, and other components for providing a data layer to control plane services. The control plane store 204 may further include one or more state machines 280 for projects replicated to the global clone in that region. The state machine s 280 may be, for example, computing devices programmed to change from one state to another in response to particular inputs or conditions. As described further herein in connection with the example of FIG. 4, the states may include an invalid state, a pending state, and a ready state. In some examples the states may further include a disabled state.

The memory 260 can store information accessible by the processor 270, including instructions 262 that can be executed by the processor 270. Memory can also include data 264 that can be retrieved, manipulated or stored by the processor 270. The memory 260 may be a type of non-transitory computer readable medium capable of storing information accessible by the processor 270, such as a hard-drive, solid state drive, tape drive, optical storage, memory card, ROM, RAM, DVD, CD-ROM, write-capable, and read-only memories. The processor 270 can be a well-known processor or other lesser-known types of processors. Alternatively, the processor 270 can be a dedicated controller such as an ASIC.

The instructions 262 can be a set of instructions executed directly, such as machine code, or indirectly, such as scripts, by the processor 270. In this regard, the terms "instructions," "steps" and "programs" can be used interchangeably herein. The instructions 262 can be stored in object code format for direct processing by the processor 270, or other types of computer language including scripts or collections of independent source code modules that are interpreted on demand or compiled in advance.

The data 264 can be retrieved, stored or modified by the processor 270 in accordance with the instructions 262. For instance, although the system and method is not limited by a particular data structure, the data 264 can be stored in computer registers, in a relational database as a table having a plurality of different fields and records, or XML documents. The data 264 can also be formatted in a computer-readable format such as, but not limited to, binary values, ASCII or Unicode. Moreover, the data 264 can include information sufficient to identify relevant information, such as numbers, descriptive text, proprietary codes, pointers, references to data stored in other memories, including other network locations, or information that is used by a function to calculate relevant data.

The instructions 262 may include performance maintenance activity 267. The maintenance activity may be executed to determine conditions of a project in the global clone, and to update the state of the global clone for the project based on the determined conditions. For example, the maintenance activity 267 may determine that the global clone for the project has been enabled, and update the global clone for the project from an invalid state to a pending state. Further, the maintenance activity 267 may determine that the global clone for the project is caught up to particular point in time of the global database. Accordingly, the maintenance activity 267 may update the state of the state machine 280 for the project, transitioning the project state from the pending state to the ready state.

Although FIG. 2 functionally illustrates the processor 270 and memory 260 as being within the same block, the processor 270 and memory 260 may actually include multiple processors and memories that may or may not be stored within the same physical housing. For example, some of the instructions 262 and data 264 can be stored on a removable CD-ROM and others within a read-only computer chip. Some or all of the instructions and data can be stored in a location physically remote from, yet still accessible by, the processor 270. Similarly, the processor 270 can actually include a collection of processors, which may or may not operate in parallel.

The database 200 may be a single storage device or a plurality of storage devices, such as hard drives, random access memory, disks, disk arrays, tape drives, etc. The database 200 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. Further, in some examples the database 200 may include virtualized or containerized environments. For example, the database 200 may include one or more virtual machines running on a host machine. The database 200 may store, for example, data files, documents, code, schemas, persistence frameworks, applications, or any of a variety of other information or tools typically stored in databases.

The stack 202 may serve requests from a client device (not shown), such as over a network. The client device may be configured with a processor, memory, instructions, and data. The client may be a personal computer, intended for use by a person having all the internal components normally found in a personal computer such as a central processing unit (CPU), hard drive, and input/output device, and all of the components used for connecting these elements to one another. The client may be any device capable of processing instructions and transmitting data to and from humans and other computers including general purpose computers, tablets, mobile phones, smartwatches, home assistants, video game systems, network computers lacking local storage capability, set top boxes for televisions, and other networked devices.

The client may include an application interface module used to access a service made available by the database 200. For example, the application interface module may include sub-routines, data structures, object classes and other type of software components used to allow servers and clients to communicate with each other. In one aspect, the application interface module may be a software module operable in conjunction with several types of operating systems known in the arts. For example, the client may be connected to a Structured Query Language (SQL) database server that may operate in conjunction with the application interface module for saving and retrieving information data.

The network, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Figure 3:
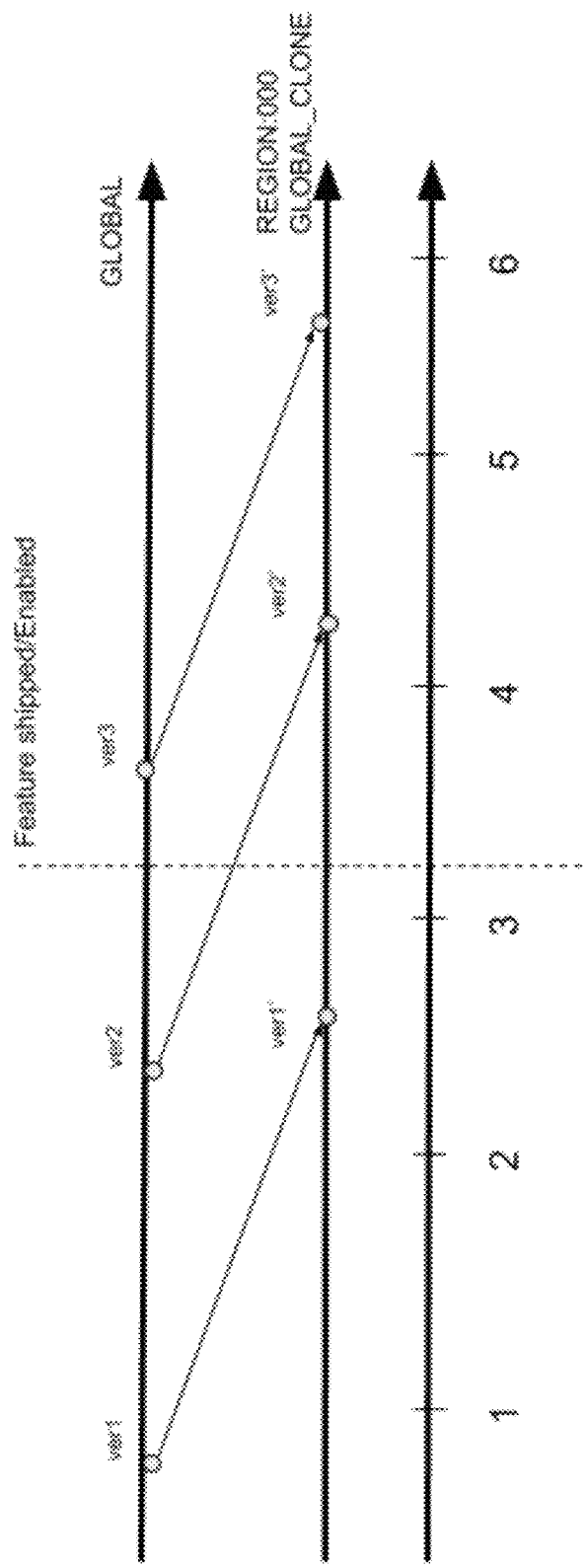
FIG. 3 is a timing diagram illustrating an example of delays between a global database and a global clone according to aspects of the disclosure.

FIG. 3 is a timing diagram illustrating an example of delays between a global database and a global clone. As shown, version 1 is updated in the global database prior to a time 1. The version may be, for example, a version of a feature, such as a project, application, or the like. Because of delays, version 1 is not replicated in the global clone until after time 2. In this example, by the time version 1 is replicated in the global clone, version 2 is available in the global database. Accordingly, if a customer request were processed at time 1, the business logic would see version 1 from the global database. At time 2, the business logic would still see version 1 from the global database.

After time 3, the feature is shipped and enabled in a particular geographic region served by a region database, such as the first region 105 of FIG. 1. As such, a customer request processed at time 3 would produce the most recent version from the global database, version 2, because at time 3 the feature has not yet been enabled in the region.

Before time 4, version 3 is implemented in the global database. At this time, however, version 2 has still not been implemented in the global clone. Accordingly, a request processed at time 4 would produce version 1 from the global clone. Although version 3 has already been implemented in the global database at this point, the global clone is producing data from a prior version. This can result in unintended side effects. For example, if version 3 was a "delete" of a virtual network, producing version 1 from the global clone would essentially "un-delete" the virtual network.

By time 5, the global clone will produce version 2 of the feature, but this version is still out of data. It is not until time 6 that the global clone is caught up to the global database. Accordingly, any requests prior to time 6 may receive inaccurate responses.

The unintended effects cause by the differences in the global database and the global clone at different times may be resolved by implementing a state machine for each project in each region. For example, referring back to FIG. 1, the state machines may be implemented in the region control plane stores 124, 164 of each region 105, 155.

Figure 4:
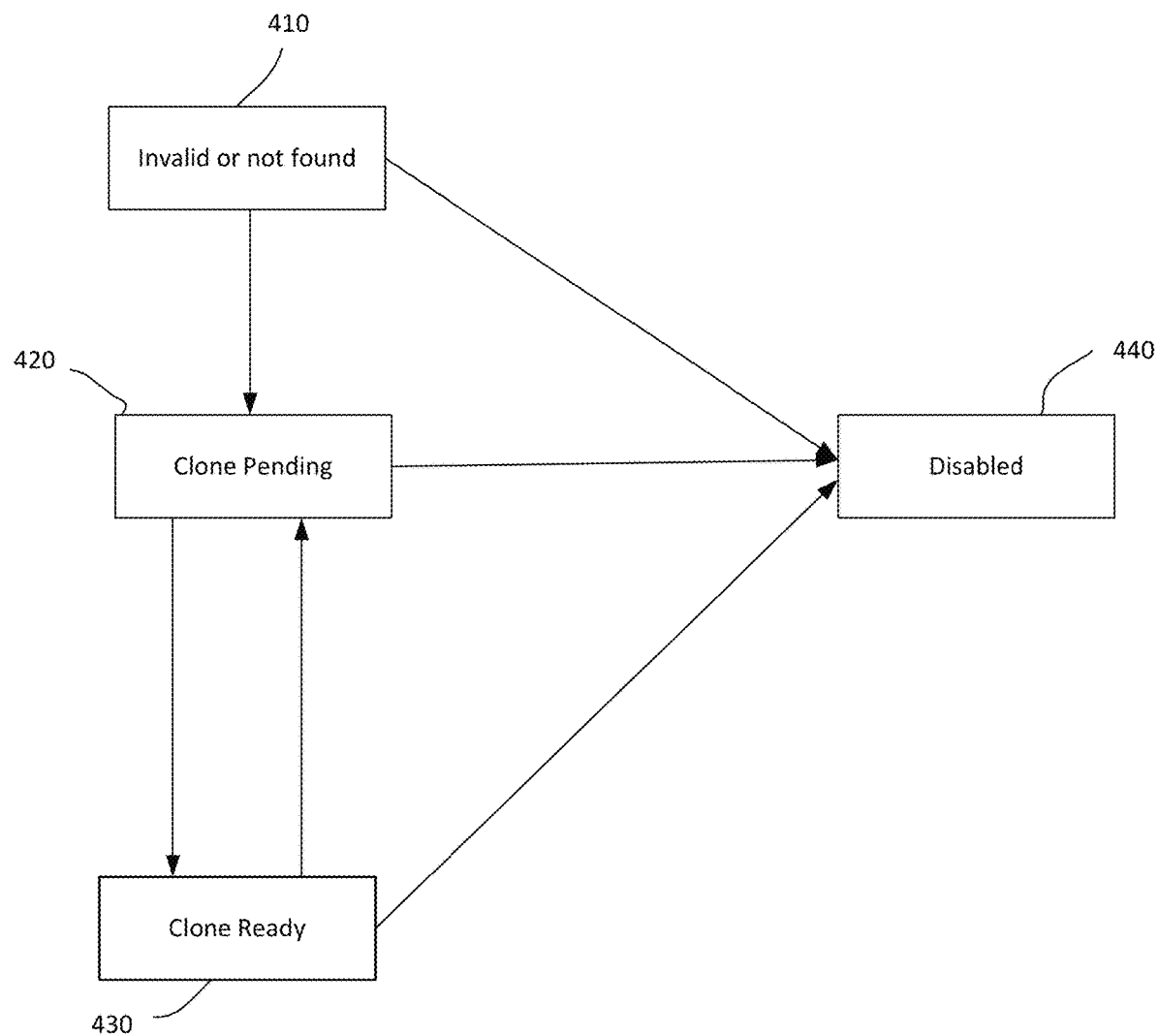
FIG. 4 is a state diagram illustrating examples of different states for projects in a global clone according to aspects of the disclosure.

FIG. 4 is a state diagram illustrating examples of the different states for projects in a global clone. According to this example, the different states include an invalid state 410, a clone_pending state 420, a clone_ready state 430, and a disabled state 440.

New projects may automatically be placed in the invalid state 410. In this state, the project may not yet be enabled in the global clone. Accordingly, all requests to read data that are processed while the project is in the invalid state will produce data from the global database.

The maintenance activity may discover new projects, for example, by scanning. For example, the maintenance activity may read every project resource in the global database and detect if the project is new. The project may be determined to be new if no project state exists in a particular region clone. When the new project has been detected, the project may be set to the clone_pending state 420. A timestamp for the time when the project is changed from the invalid state 410 to the clone_pending state 420 is recorded. For example, as described further in connection with FIG. 5 below, the timestamp may be recorded in the regional database along with an indication of the state for the project.

All global data requests to a region control plane store for a project in the clone_pending state 420 are redirected to the global database at a time corresponding to the recorded timestamp. For example, a project may transition from the invalid state 410 to the clone_pending state 420 at a time t1, and time t1 is recorded. While a read request may be received at a later time t1+x, if the project is still in the clone_pending state 420, the read request will be redirected to the global database at time t1. While it is possible that the global database may have been updated with a newer version of the project between time t1 and time t1+x, the version at time t1 will nevertheless be produced for consistency.

The maintenance activity in the region control plane store may also detect transactions for projects in the clone_pending state 420. For example, the maintenance activity may detect that a threshold number of reads or writes for the project have occurred. The threshold number may be one or more. When this occurs, the maintenance activity may determine whether the project should be transitioned to the clone_ready state 430. For example, the maintenance activity may verify whether the global clone in that region is caught up to the global database for the project. The global clone may be considered caught up if the most recent version available in the global clone is the same as the version available in the global database as of the recorded timestamp. If the global clone is caught up, the maintenance activity changes the state of the project to the clone_ready state 430. In the clone_ready state 430, all reads are fulfilled by the global clone.

The maintenance activity may further detect when the project in the clone_ready state 430 becomes inconsistent with the global database. For example, the maintenance activity may periodically check whether the global clone is still caught up to the global database. In other examples, the maintenance activity may detect updates to the global database for the project, and may in response check whether the update has been replicated to the global clone. When the global clone for the project is determined to be inconsistent with the global database, the state for the project may transition from the clone_ready state 430 back to the clone_pending state.

At any time, the project may be transitioned to the disabled state 440. For example, regardless of whether the project is in the initial state, clone_pending state, or clone_ready state, the clone for the project may be manually disabled, such as by a site reliability engineering operator via tools. The clone may be disabled for repairs to hardware, resolution of errors or failures, regular maintenance, etc.

Figure 5:
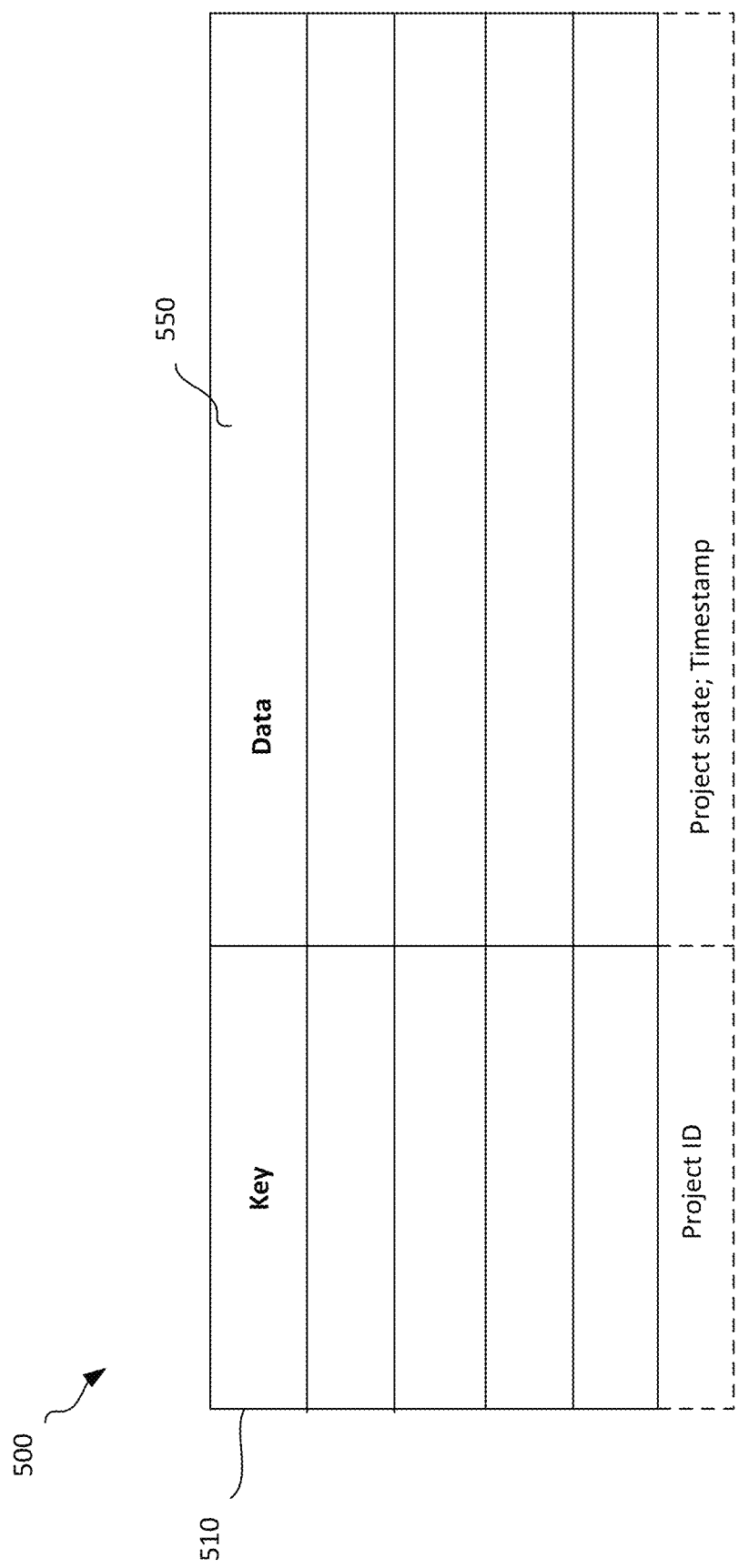
FIG. 5 illustrates an example of data chunks according to aspects of the disclosure.

FIG. 5 illustrates an example of how the project state may be identified along with data stored in the regional database. When the global database is updated, the updates may be replicated to the regional database in chunks. For example, FIG. 5 illustrates a regional database table 500, where the chunks of data are rows. Each row has a key 510 that identifies corresponding data 550. As the project is updated, one or more rows may be added, deleted, or modified. In addition, a row may be added identifying the state for the project. For example, as shown, the key may include an identifier for the project. The row may further identify the project state, and the timestamp of the time when the project transitioned to that project state. Each time the project state changes, the row may be updated to reflect the most current project state and the timestamp indicating the time when the transition to that state occurred.

The table 500 may include data for one or multiple projects. Where multiple projects are included, the projects may be in different states at different times. Accordingly, each project will have a separate identifier, a separate project state, and a separate timestamp. For example, while Project A may have entered a clone_pending state at time t1, Project B may have entered a clone_ready state at time t2. As each of Project A and Project B transition to different state, their corresponding rows may be individually updated to reflect the most current state and timestamp.

While the table is described above as being located in the global clone, according to other examples it may be stored elsewhere in a region, such as in a region database.

Figure 6:
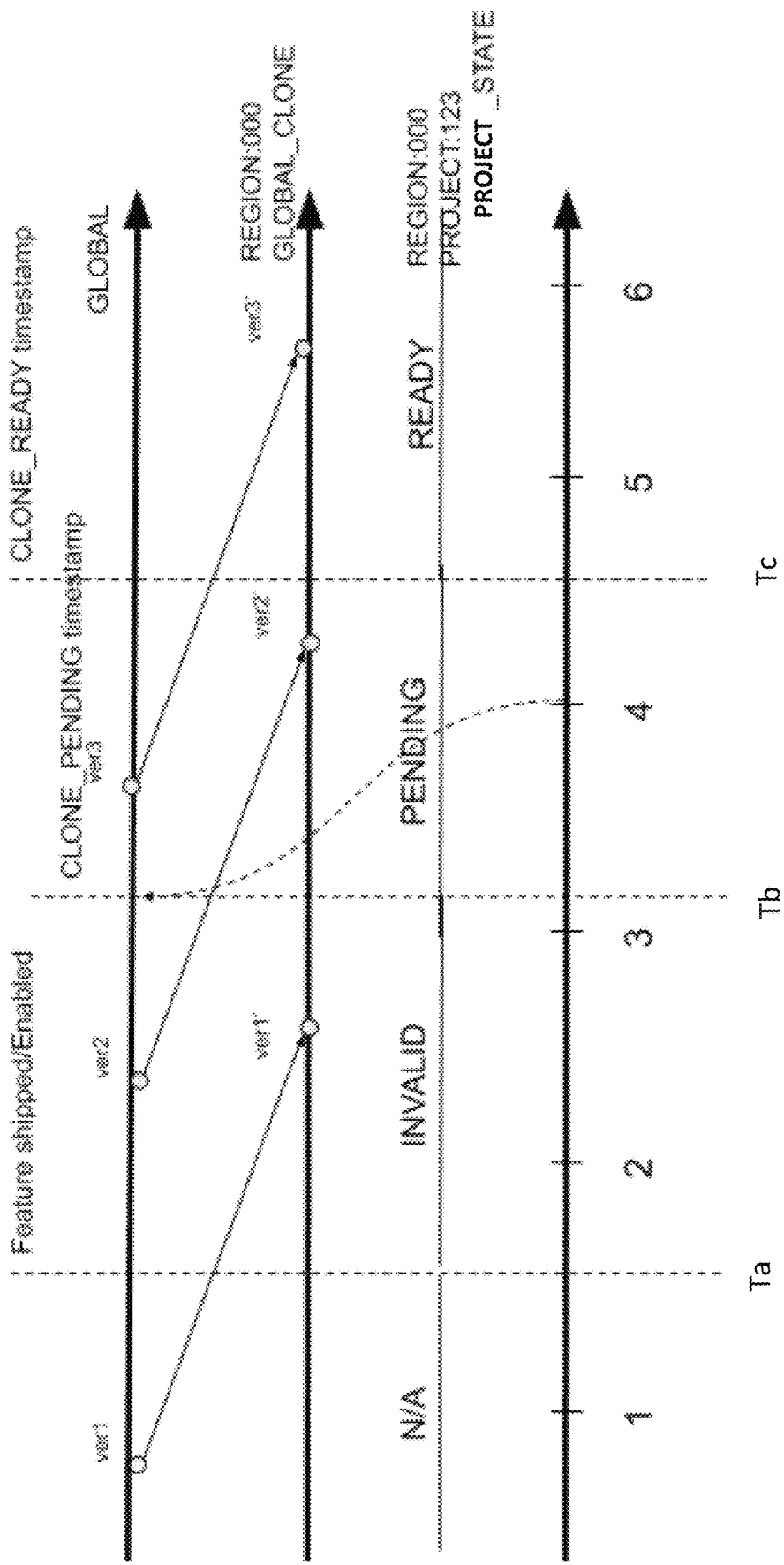
FIG. 6 is another timing diagram illustrating example transactions according to aspects of the disclosure.

FIG. 6 illustrates a timing diagram where the states for individual projects are recorded in the regional database. The timing of the updates to the global database for the project and to the global clone is the same as the timing of FIG. 3. However, because the reads are processed based on the project states, the read requests will be handled differently than explained above in connection with FIG. 3.

Version 1 is updated in the global database prior to a time 1, but is not replicated in the global clone until after time 2. At time $T_a$, when the project is first enabled in the global clone, the project enters the invalid state. Accordingly, if a customer request were processed at time 1, the business logic would see version 1 from the global database.

After time $T_a$ and time 2, version 1 is enabled in the global clone. However, by this time, version 2 is available in the global database. At time 2, the business logic would still see version 1 from the global database, because it would ignore the global clone when the project is in the invalid state. Similarly, at time 3, when the project is still in the invalid state, the business logic would ignore the global clone and read version 2 from the global database.

At time $T_b$, the project is detected in the global clone. Accordingly, the project transitions from the invalid state to the clone_pending state. The timestamp $T_b$ is recorded as the time when the project entered the clone_pending state. As such, a customer request processed at time 4, when the project is still in the clone_pending state, would refer to the global database. However, rather than referring to the global database at the time 4, when version 3 has already been implemented in the global database, the request is referred to the global database at the time $T_b$, when the project entered the clone_pending state. Accordingly, the read request would produce version 2 from the global database.

At time Tc, the project enters the clone_ready state. For example, the control plane store may have verified that the global clone is up to date as compared to the global database as of time Tb. Accordingly, the project transitions to the clone_ready state at time Tc, and the timestamp Tc is recorded.

A read processed at time 5 will produce version 2 of the feature from the global clone. By time 6, version 3 of the project has been implemented in the global clone. Accordingly, a read at time 6 will produce version 3 from the global clone.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 7:
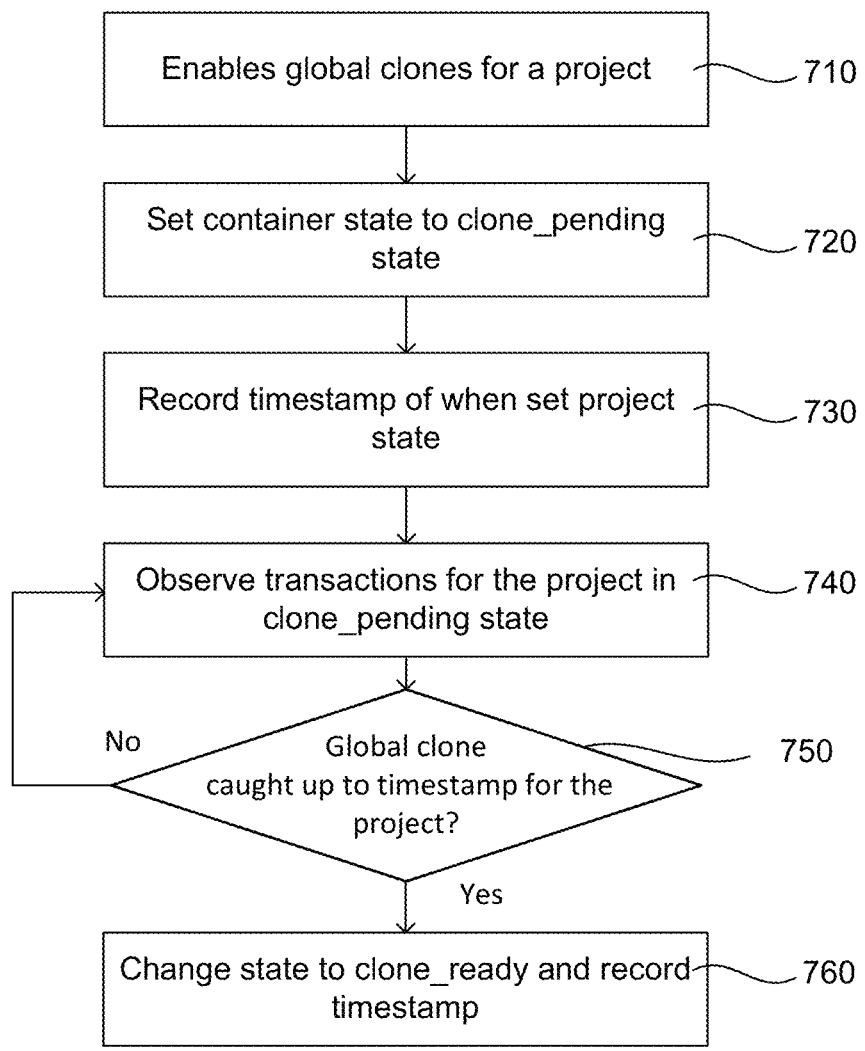
FIG. 7 is a flow diagram illustrating an example method of setting states for projects according to aspects of the disclosure.

FIG. 7 is a flow diagram illustrating an example method of setting states for projects. The project may be, for example, a customer, a directory, an application, or any other unit of replication.

In block 710, global clones in a region are enabled for a particular project in the global database. For example, the project may be sent from the global database to the global clone in the region for replication. The project may be sent in data chunks over a network. There may be a significant physical distance between the global database and the global clone. Accordingly, there may be a delay between a time the global database begins sending the data, when the global clones are first enabled, and when the project is fully implemented in the global clone.

In block 720, a state for the project is set to a clone_pending state, indicating that the project has been enabled in the global clone but is not yet caught up to the global database. The project state may be updated by, for example, a data layer for control plane services, such as a region control plane store. The project state may be indicated in the regional database along with data for the project. For example, a row may be appended to a database table for the project, wherein the row indicates the project state.

In block 730, a timestamp is recorded for a time when the project state is updated. For example, if the project state was set to the clone_pending state at a time t, then time t is recorded. The timestamp may be recorded along with the indication of project state, such as in the regional database.

In block 740, transactions for the project in the clone_pending state are observed. For example, maintenance activity in the control plane store may detect whether there have been any transactions for the project, such as read requests.

In block 750, it is determined whether the global clone for the project is caught up to the global database. For example, it may be determined whether the global clone has fully implemented a version of the project that was implemented in the global database at the recorded timestamp. The determination may be made by the maintenance activity of the control plane store. If the global clone is not caught up, the project may remain in the clone_pending state and the maintenance activity may wait. For example, the maintenance activity may continue to observe transactions until it determines that the global clone has caught up to the recorded timestamp.

If it is determined in block 750 that the global clone for the project has caught up to the recorded timestamp, in block 760 the project is transitioned to a clone_ready state, indicating that the global clone for the project has caught up. For example, the indication of the project state in the database may be updated to reflect the new state. Additionally, a new timestamp, corresponding to the time of transition from the clone_pending state to the clone_ready state, is recorded along with the updated state.

Figure 8:
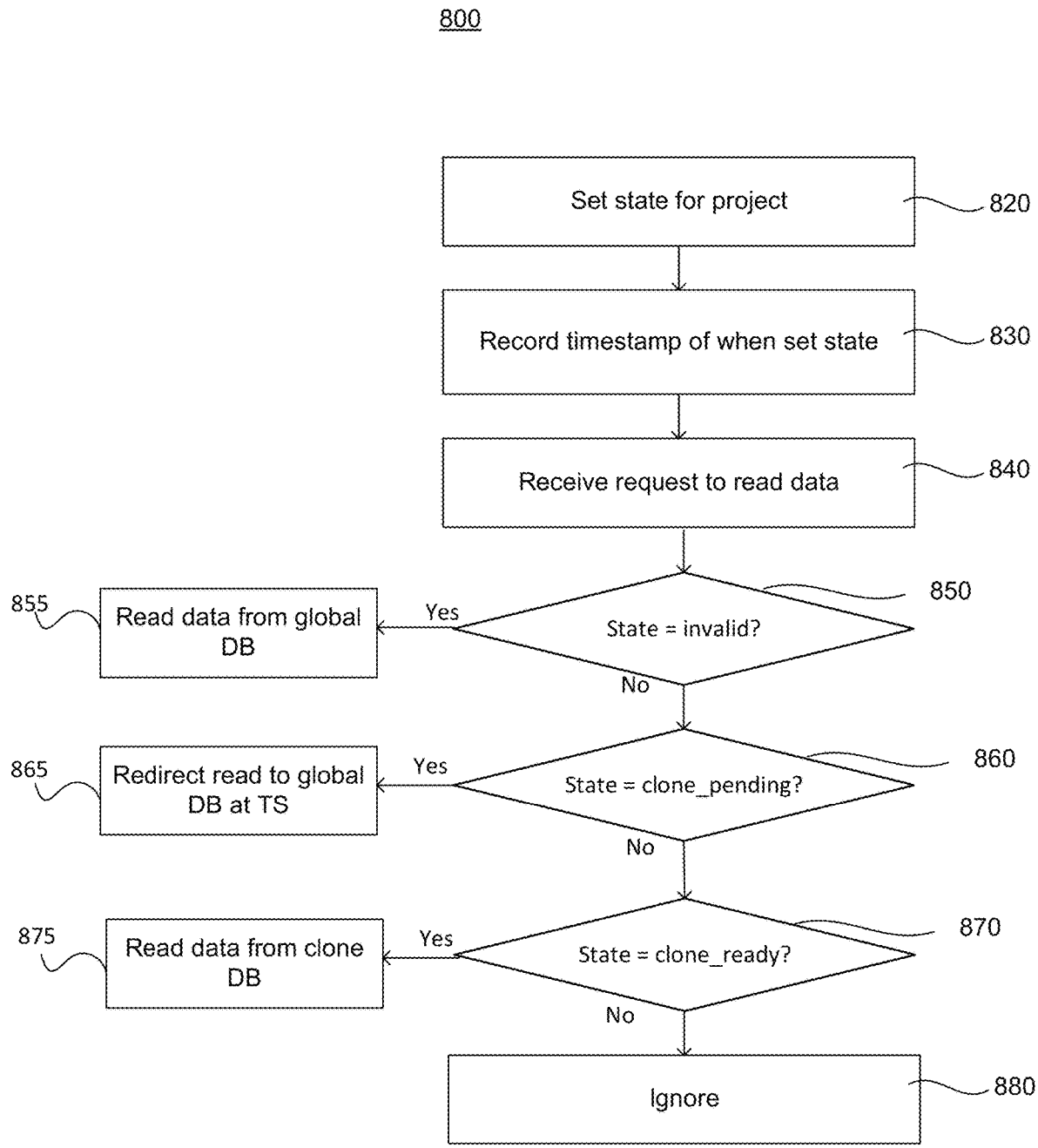
FIG. 8 is a flow diagram illustrating an example method of serving read requests based on project state according to aspects of the disclosure.

FIG. 8 is a flow diagram illustrating an example method of serving read requests based on the project state. In block 820 the project state is set, and in block 830 the timestamp for when the project state was set is recorded. For example, as discussed above in connection with blocks 720 and 730 of FIG. 7, the project state may be set by the maintenance activity of the control plane store and recorded in the region database along with the timestamp.

In block 840, a request to read data for the project is received, for example, at the region stack. The request will be handled depending on the state for the project.

In block 850, it is determined whether the global clone for the project is in the invalid state. If so, the read request will be served by the global database (block 855).

In block 860, it is determined whether the global clone for the project is in the pending state. If so, the global clone is not ready to serve the read request. Accordingly, the read request is redirected to the global database at the timestamp (block 865). For example, data in the global database is preserved for a period of time, such as hours, days, etc., despite that an updated version for the project may have been implemented that later changed the data. The read request is directed to a time in the global database corresponding to a time of the recorded timestamp, although the request may have been received at a later time and the global database may have since been further updated.

In block 870, it is determined whether the global clone is in the ready state, in which it has been updated with the data that was in the global database at the recorded timestamp. If the global clone is in the ready state, the read request may be served by reading data from the clone database (block 875).

If the clone is not in the pending or ready state, it may be determined that the clone is disabled. Accordingly, in block 880, the read request is ignored.

The systems and methods described above are advantageous in that they provide for consistent reads in a global clone that is replicated from a global database. By redirecting only some request to the global database, and serving others by the global clone, a load on the global database is reduced. Moreover, requests served by the global clone may produce data faster than the global database, such as if the request is issued from the same region as the global clone. Additionally, because requests that are redirected to the global database are redirected to an earlier point in time that corresponds to when the status of the global clone changed, the data read from the global database will be consistent with that of the global clone, thereby reducing unintended effects.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
   receiving data at a global clone in a region, the data being for a project and received from a global database for replication;
   determining, by one or more processors in the region, whether the project is new by determining that no state for the project exists at the global clone in the region;
   setting, by one or more processors in the region, a state for the project to a first state in response to determining that the project is new, wherein the first state is a pending state;
   observing transactions for the project in the first state;
   determining, with the one or more processors based on the observing, whether the global clone for the project is caught up to the global database; and
   transitioning the project to a second state in response to determining that the global clone is caught up to the global database,
   wherein the second state is a ready state for the project.

2. The method of claim 1, further comprising recording, by the one or more processors in the region, a timestamp corresponding to a time the state was set to the first state.

3. The method of claim 2, further comprising:
   receiving, by the one or more processors in the region, a request to read data for the project; and
   upon determining that the state for the project is in the first state, redirecting the request to the global database at the time corresponding to the timestamp.

4. The method of claim 2, wherein determining whether the global clone is caught up to the global database comprises determining, by the one or more processors in the region, whether the global clone has been updated with the same data as in the global database as of the time of the timestamp.

5. The method of claim 2, wherein recording the timestamp comprises appending the timestamp in a row in a data table in the global clone or in a region database.

6. The method of claim 5, further comprising recording the timestamp along with an indication of the state and an identifier for the project.

7. The method of claim 1, wherein the transactions comprise write transaction to the global database for the project.

8. The method of claim 1, further comprising:
   receiving, by the one or more processors in the region, a request to read data from the project; and
   upon determining that the project is in the second state, fulfilling the request using data from the global clone.

9. The method of claim 1, wherein observing the transactions comprises detecting, by maintenance activity in a control plane, whether any requests for the project have been received.

10. A system, comprising:
    a global clone in a region, the global clone configured to replicate data from a global database for a project; and
    one or more computing devices with one or more memories to store instructions, the instructions are executed by the one or more computing devices to:
    receive data for the project from the global database at the global clone for replication;
    determine whether the project is new by determining that no state for the project exists at the global clone in the region;
    set a state for the project to a first state in response to determining that the project is new, wherein the first state is a pending state;
    observe transactions for the project in the first state;
    determine, based on the observed transactions, whether the global clone for the project is caught up to the global database; and
    transition the project to a second state in response to determining that the global clone is caught up to the global database, wherein the second state is a ready state for the project.

11. The system of claim 10, wherein the one or more computing devices are further configured to record a timestamp corresponding to a time the state was set to the first state.

12. The system of claim 11, wherein the one or more computing devices are further configured to:
receive a request to read data for the project; and
upon determining that the state for the project is in the first state, redirect the request to the global database at the time corresponding to the timestamp.

13. The system of claim 11, wherein in determining whether the global clone is caught up to the global database the one or more computing devices are configured to:
determine whether the global clone has been updated with the same data as in the global database as of the time of the timestamp.

14. The system of claim 11, wherein recording the timestamp comprises appending the timestamp in a row in a data table in the global clone or in a region database.

15. The system of claim 14, wherein the one or more computing devices are further configured to record the timestamp along with an indication of the state and an identifier for the project.

16. The system of claim 10, wherein the transactions comprise write transaction to the global database for the project.

17. The system of claim 10, wherein the one or more computing devices are further configured to:
receive a request to read data from the project; and
upon determining that the project is in the second state, fulfil the request using data from the global clone.

18. A non-transitory computer-readable medium storing instructions executable by one or more processors for performing a method of serving read requests to a global clone, the method comprising:
receiving data for a project from a global database at the global clone for replication;
determining, with the one or more processors, whether the project is new by determining that no state for the project exists at the global clone in the region;
setting a state for the project to a first state in response to determining that the project is new, wherein the first state is a pending state;
observing transactions for the project in the first state;
determining, with the one or more processors based on the observing, whether the global clone for the project is caught up to the global database; and
transitioning the project to a second state in response to the determining that the global clone is caught up to the global database,
wherein the second state is a ready state for the project.

19. The computer-readable medium of claim 18, wherein determining whether the global clone is caught up comprises determining whether the global clone has been updated with the same data as in the global database as of a time the state for the project was set to the first state.

20. The computer-readable medium of claim 18, wherein execution of the instructions further provides for:
receiving a request to read data from the project; and
upon determining that the project is in the second state, fulfilling the request using data from the global clone.

* * * * *